United States Patent
Metzger

(10) Patent No.: US 11,007,892 B2
(45) Date of Patent: May 18, 2021

(54) METHOD AND SYSTEM FOR IDENTIFYING A VEHICLE TYPE OF A VEHICLE

(71) Applicant: Dr. Ing. h.c. F. Porsche Aktiengesellschaft, Stuttgart (DE)

(72) Inventor: Christian Metzger, Tamm (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 189 days.

(21) Appl. No.: 16/269,928

(22) Filed: Feb. 7, 2019

(65) Prior Publication Data

US 2019/0263286 A1    Aug. 29, 2019

(30) Foreign Application Priority Data

Feb. 27, 2018  (DE) .......................... 102018104408.9

(51) Int. Cl.
*B60L 53/65* (2019.01)
*B60L 53/62* (2019.01)

(52) U.S. Cl.
CPC ............. *B60L 53/65* (2019.02); *B60L 53/62* (2019.02)

(58) Field of Classification Search
CPC ................................ B60L 53/65; B60L 53/62
USPC .......................................................... 320/109
See application file for complete search history.

(56) References Cited

U.S. PATENT DOCUMENTS

| | | | | |
|---|---|---|---|---|
| 5,200,686 A * | 4/1993 | Lee | ..................... | H02J 7/00047 320/112 |
| 5,548,200 A * | 8/1996 | Nor | ..................... | H02J 7/0027 320/109 |
| 5,803,215 A * | 9/1998 | Henze | ..................... | B60L 55/00 191/2 |
| 7,567,085 B2 * | 7/2009 | Kim | ..................... | G01R 31/389 324/426 |
| 7,573,237 B2 * | 8/2009 | Cutrona | ................ | H02J 7/0047 320/132 |
| 7,999,506 B1 | 8/2011 | Hollar et al. | | |
| 8,116,915 B2 * | 2/2012 | Kempton | ................ | H02J 9/062 700/291 |
| 8,143,842 B2 * | 3/2012 | Tyler | ..................... | B60L 53/34 320/104 |
| 8,169,186 B1 * | 5/2012 | Haddad | ................... | B60L 53/65 320/109 |

(Continued)

FOREIGN PATENT DOCUMENTS

| | | |
|---|---|---|
| CN | 106058980 A | 10/2016 |
| WO | 2004042673 A2 | 5/2004 |

*Primary Examiner* — John T Trischler
(74) *Attorney, Agent, or Firm* — RatnerPrestia

(57) ABSTRACT

A method and system for identifying a vehicle type of a vehicle having an electric drive and a traction battery, in which a charging behavior of the vehicle that occurs during a current operation of charging the traction battery at a charging column is captured. A current charging profile is created for the current charging operation on the basis of the captured charging behavior. The current charging profile is compared with respective charging profiles which are retrievably stored in a storage unit and are each specific to a respective particular vehicle type. A probability of a presence of a particular vehicle type from the plurality of vehicle types is determined on the basis of the comparison. The vehicle type most likely to be present is identified as the vehicle type and the current charging operation is adapted to the vehicle type which is most likely to be present.

14 Claims, 2 Drawing Sheets

(56) References Cited

U.S. PATENT DOCUMENTS

| | | | | |
|---|---|---|---|---|
| 8,198,859 B2* | 6/2012 | Tyler | B60L 53/65 | 320/109 |
| 8,258,743 B2* | 9/2012 | Tyler | B60L 53/665 | 320/104 |
| 8,378,627 B2* | 2/2013 | Asada | B60L 58/20 | 320/109 |
| 8,405,354 B2* | 3/2013 | Sakakibara | H02J 3/32 | 320/132 |
| 8,466,656 B2* | 6/2013 | Hooker | B60L 58/10 | 320/109 |
| 8,508,188 B2* | 8/2013 | Murtha | H02J 7/0003 | 320/110 |
| 8,509,976 B2* | 8/2013 | Kempton | G06Q 50/06 | 701/22 |
| 8,639,409 B2* | 1/2014 | Ramaswamy | H02J 3/06 | 701/31.5 |
| 8,823,330 B2* | 9/2014 | Ree | B60L 53/68 | 320/162 |
| 8,853,999 B2* | 10/2014 | Haddad | B60L 53/37 | 320/109 |
| 9,000,721 B2* | 4/2015 | Hernandez | B60L 53/30 | 320/109 |
| 9,043,038 B2* | 5/2015 | Kempton | B60L 53/14 | 700/291 |
| 9,118,183 B2* | 8/2015 | Erger | B60L 53/65 | |
| 9,162,583 B2* | 10/2015 | Ichikawa | B60L 50/52 | |
| 9,348,381 B2* | 5/2016 | Khoo | G06Q 20/24 | |
| 9,471,838 B2* | 10/2016 | Miller | G06K 9/00791 | |
| 9,475,393 B2* | 10/2016 | Hooker | B60L 58/10 | |
| 9,649,949 B2* | 5/2017 | Kim | H04L 12/40 | |
| 9,669,719 B1* | 6/2017 | Gerber | B60L 53/16 | |
| 9,754,300 B2* | 9/2017 | Kempton | B60L 53/63 | |
| 9,853,488 B2* | 12/2017 | Fincham | B60L 55/00 | |
| 9,908,427 B2* | 3/2018 | Baxter | B60L 53/63 | |
| 10,005,371 B2* | 6/2018 | Reineccius | H02J 3/381 | |
| 10,106,048 B2* | 10/2018 | Haddad | B60L 53/65 | |
| 10,150,380 B2* | 12/2018 | Vaughan | B60L 53/68 | |
| 10,169,783 B2* | 1/2019 | Khoo | G01C 21/3476 | |
| 10,185,977 B2* | 1/2019 | Khoo | G06Q 50/06 | |
| 10,185,978 B2* | 1/2019 | Khoo | H02J 7/0029 | |
| 10,192,245 B2* | 1/2019 | Khoo | H04L 67/10 | |
| 10,210,552 B2* | 2/2019 | Khoo | H04W 4/40 | |
| 10,333,322 B2* | 6/2019 | Arends | H02J 7/0068 | |
| 10,333,323 B2* | 6/2019 | Arends | H02J 7/0068 | |
| 10,336,194 B2* | 7/2019 | Ricci | B60L 53/38 | |
| 10,399,451 B2* | 9/2019 | Zaki | B60L 3/04 | |
| 10,442,301 B2* | 10/2019 | Gerber | B60L 53/11 | |
| 10,467,895 B2* | 11/2019 | Nordbruch | G08G 1/146 | |
| 10,586,258 B2* | 3/2020 | Khoo | H04L 25/20 | |
| 10,654,363 B2* | 5/2020 | Hourtane | B60L 5/42 | |
| 2006/0152224 A1* | 7/2006 | Kim | G01R 31/392 | 324/430 |
| 2007/0194756 A1* | 8/2007 | Cutrona | H02J 7/0047 | 320/132 |
| 2009/0222143 A1* | 9/2009 | Kempton | H02J 3/32 | 700/291 |
| 2010/0017249 A1* | 1/2010 | Fincham | G06Q 50/06 | 705/412 |
| 2010/0141204 A1* | 6/2010 | Tyler | B60L 53/665 | 320/109 |
| 2010/0141205 A1* | 6/2010 | Tyler | B60L 53/65 | 320/109 |
| 2010/0145535 A1* | 6/2010 | Tyler | B60L 53/16 | 700/292 |
| 2010/0264874 A1* | 10/2010 | Murtha | H02J 7/0003 | 320/110 |
| 2010/0270974 A1* | 10/2010 | Sakakibara | H02J 3/32 | 320/132 |
| 2011/0031929 A1* | 2/2011 | Asada | B60L 53/14 | 320/109 |
| 2011/0169447 A1* | 7/2011 | Brown | B60L 3/0069 | 320/109 |
| 2011/0193522 A1* | 8/2011 | Uesugi | B60L 3/12 | 320/109 |
| 2011/0202192 A1* | 8/2011 | Kempton | B60L 53/68 | 700/291 |
| 2011/0202217 A1* | 8/2011 | Kempton | G06Q 50/06 | 701/22 |
| 2011/0202418 A1* | 8/2011 | Kempton | B60L 53/65 | 705/26.1 |
| 2011/0254504 A1* | 10/2011 | Haddad | B60L 53/37 | 320/109 |
| 2012/0083932 A1* | 4/2012 | Ramaswamy | B60L 53/63 | 700/291 |
| 2012/0098487 A1* | 4/2012 | Hooker | B60L 58/10 | 320/109 |
| 2012/0112697 A1* | 5/2012 | Heuer | B60L 53/65 | 320/109 |
| 2012/0126748 A1 | 5/2012 | Haddad et al. | | |
| 2012/0139489 A1* | 6/2012 | Gaul | B60S 5/02 | 320/109 |
| 2012/0179311 A1* | 7/2012 | Skaff | B60L 58/12 | 701/22 |
| 2012/0274287 A1 | 11/2012 | Ree et al. | | |
| 2012/0277945 A1* | 11/2012 | Ichikawa | H02J 7/04 | 701/22 |
| 2013/0002197 A1* | 1/2013 | Hernandez | B60L 53/24 | 320/109 |
| 2013/0063086 A1* | 3/2013 | Hooker | B60L 3/0046 | 320/109 |
| 2013/0110296 A1 | 5/2013 | Khoo et al. | | |
| 2013/0124320 A1* | 5/2013 | Karner | G06Q 10/02 | 705/14.54 |
| 2013/0214737 A1 | 8/2013 | Wu et al. | | |
| 2013/0289821 A1* | 10/2013 | Nakagawa | B60L 53/14 | 701/31.4 |
| 2013/0328525 A1 | 12/2013 | Erger | | |
| 2014/0049217 A1* | 2/2014 | Nakagawa | B60L 53/60 | 320/109 |
| 2015/0002094 A1* | 1/2015 | Haddad | B60L 53/65 | 320/109 |
| 2015/0073591 A1* | 3/2015 | Falk | B60L 53/68 | 700/237 |
| 2015/0123610 A1* | 5/2015 | Zaki | B60L 53/65 | 320/109 |
| 2015/0137753 A1* | 5/2015 | Cha | B60L 53/65 | 320/109 |
| 2015/0224890 A1* | 8/2015 | Kim | B60L 11/1851 | 320/109 |
| 2016/0144735 A1* | 5/2016 | Haddad | B60L 53/65 | 320/109 |
| 2016/0185246 A1* | 6/2016 | Paul | B60L 53/67 | 320/106 |
| 2016/0285282 A1* | 9/2016 | Arends | H02J 7/0045 | |
| 2016/0285289 A1* | 9/2016 | Arends | H02J 7/342 | |
| 2016/0339792 A1* | 11/2016 | Khoo | G08G 1/144 | |
| 2016/0339793 A1* | 11/2016 | Khoo | G06Q 10/02 | |
| 2016/0362016 A1* | 12/2016 | Khoo | B60L 53/65 | |
| 2016/0364658 A1* | 12/2016 | Khoo | B60L 53/31 | |
| 2016/0364776 A1* | 12/2016 | Khoo | H04L 25/20 | |
| 2017/0008413 A1* | 1/2017 | Reineccius | B60L 53/65 | |
| 2017/0136907 A1* | 5/2017 | Ricci | B60L 53/36 | |
| 2017/0253135 A1* | 9/2017 | Hourtane | B60L 53/16 | |
| 2017/0274792 A1* | 9/2017 | Vaughan | B60L 53/14 | |
| 2018/0001781 A1* | 1/2018 | Quattrini, Jr. | B60L 53/11 | |
| 2018/0037128 A1* | 2/2018 | Gerber | B60L 11/1838 | |
| 2018/0123360 A1* | 5/2018 | Eaves | H02J 7/00032 | |
| 2018/0131221 A1* | 5/2018 | Ambroziak | B60L 53/14 | |
| 2019/0031036 A1* | 1/2019 | Haddad | B60L 53/37 | |
| 2019/0139107 A1* | 5/2019 | Khoo | B60L 53/305 | |
| 2019/0156382 A1* | 5/2019 | Khoo | G01C 21/3492 | |
| 2019/0156383 A1* | 5/2019 | Khoo | B60L 53/63 | |
| 2019/0156384 A1* | 5/2019 | Khoo | B60L 53/14 | |
| 2019/0180336 A1* | 6/2019 | Khoo | G06Q 30/0206 | |
| 2019/0202313 A1* | 7/2019 | Haddad | B60L 53/65 | |
| 2019/0283619 A1* | 9/2019 | Metzger | H02J 1/102 | |

* cited by examiner

METHOD AND SYSTEM FOR IDENTIFYING A VEHICLE TYPE OF A VEHICLE

CROSS-REFERENCE TO RELATED APPLICATION

This application claims priority to German Patent Application No. DE 10 2018 104 408.9, filed Feb. 27, 2018, which is incorporated by reference herein in its entirety.

FIELD OF THE INVENTION

The present invention relates to a method and a system for identifying a vehicle type of a vehicle comprising an electric drive on the basis of a charging profile.

BACKGROUND OF THE INVENTION

When charging a vehicle having an electric drive, in particular when charging electric vehicles, it is currently not possible to identify which vehicle is currently being charged at the respective charging column on account of a standardized communication protocol (CPP). The OCPP (Open Charge Point Protocol) is a generally used application protocol which standardizes communication between a charging station or a charging column for electric vehicles and a central management system. This enables manufacturer-independent communication between a charging station for electric automobiles and various accounting and management systems of charging infrastructures. It is also ensured that vehicles, charging stations and communication and network systems can act in accordance with one another.

Not all aspects relating to the charging of a vehicle at a charging column are covered by the IEC 61851-23, incorporated by reference herein, standard for conductive charging systems for electric vehicles, for example communication between a respective charging column and a vehicle to be charged. Therefore, the IEC 61851-23 standard leaves room for interpretation. Vehicles from different original equipment manufacturers (OEMs) generally exhibit a different behavior during charging, that is to say a different charging behavior. In this case, current and/or voltage values which are requested from the charging column by the vehicle at the start of the charging operation and/or over the further course of the charging operation may vary from vehicle type to vehicle type. The same applies to the type of a connection set-up between the charging column and the vehicle, in which case the time sequence (timing), the set-up and the emitted and received signals can vary here from vehicle type to vehicle type, for example.

In order to be able to ensure reliable charging, manufacturer-specific implementations of a charging operation may be required. In order to change over between different implementations of this type or parameter sets or branches with respect to progress of the charging of a vehicle, it is advantageous to be able to reliably identify the vehicle currently connected to the charging column.

US 2013/0214737, incorporated by reference herein, discloses a data transmission apparatus which is used between a charging device and an electric vehicle. In this case, an internal interface which is compatible with messages of a first protocol, an external interface which is compatible with the messages of a second protocol and an external conversion module are provided, wherein the conversion module is configured to receive and convert messages of the second protocol from the electric vehicle in order to transmit corresponding messages of the first protocol to the charging device. An in-to-out transformation module is also provided and is configured to receive and convert messages of the first protocol from the charging device and to transmit them as a message of the second protocol to the electric vehicle.

US 2013/0110296, incorporated by reference herein, discloses a method for controlling and regulating an operation of charging an electric vehicle. The method described comprises receiving a charging order from an electric vehicle via a network connection between a charging station and a cloud server, wherein the network connection comprises a mobile device which is designed to simplify communication between the charging station and the cloud server.

CN 106058980, incorporated by reference herein, discloses an automatic voltage detection charging pile which can be used to automatically identify the battery model of an electric vehicle to be charged, with the result that a suitable charging voltage can be calculated and a suitable charging voltage is automatically selected.

However, none of the documents mentioned discloses a possible way of identifying a vehicle type of an electric vehicle to be charged and adapting a charging operation according to the identified vehicle type.

In view of the foregoing challenges, a method and a system are disclosed for identifying a vehicle type of a vehicle. Further configurations of the system and of the method are apparent from the description.

The method according to aspects of the invention is provided for the purpose of identifying a vehicle type of a vehicle having an electric drive and a traction battery. In the method according to aspects of the invention, a charging behavior of the vehicle that occurs during a current operation of charging the traction battery at a charging column is captured using sensors during said charging operation, and a current charging profile is created for the current operation of charging the vehicle on the basis of the captured charging behavior. The current charging profile is then compared with respective charging profiles which are stored in a storage unit and are each specific to a respective particular vehicle type from a plurality of vehicle types. A probability of a presence of a particular vehicle type from the plurality of vehicle types is determined on the basis of the comparison which has been carried out. The vehicle type most likely to be present is identified as the vehicle type of the vehicle and the current charging operation is adapted to the vehicle type which is most likely to be present.

When calculating the probability of a presence of a particular vehicle type by comparing the currently created charging profile with the retrievably stored charging profiles, it is conceivable, in one configuration, for the charging profile to be evaluated with regard to predefined features included in the charging profile.

In another configuration, charging profiles of vehicles which have previously been charged, in particular at the charging column, and from which a respective charging profile has accordingly been created are stored as the retrievable charging profiles in the storage unit. Therefore, a history of created charging profiles for various vehicle types is used to create a database of charging profiles for various vehicle types, which database is in turn used to compare currently created charging profiles with the charging profiles stored in the database. The database is preferably continuously updated, that is to say, in a further configuration, the created current charging profile in the storage unit or in the database included in the latter is retrievably stored and is therefore provided for a future comparison with a corresponding charging profile to be created in future.

In yet another configuration of the method according to aspects of the invention, an original equipment manufacturer (OEM) of the vehicle a series of the vehicle and/or a derivative of the vehicle is/are identified on the basis of the identified vehicle type of the vehicle. This makes it possible to ensure that OEM-specific implementations of a charging operation can be adjusted in order to make it possible to reliably charge the corresponding vehicle at the respective charging column. This means that a multiplicity of implementations or parameter sets or branches for charging respective vehicles of different vehicle types are provided in the charging, column or the charging station, in which case it is possible to change over between the implementations or parameter sets. In order to usefully change over between different implementations, it is therefore necessary to reliably identify the vehicle type of the vehicle to be currently charged, which is enabled in a simple manner with the aid of the method according to aspects of the invention.

In one possible configuration, the charging operation is adapted specifically to the identified vehicle type with respect to the charging time and/or costs and/or charging reliability.

In further configuration, the capture of the charging behavior comprises capturing characteristic values typical of charging. In this case, the characteristic values are selected from the group at least comprising: parameters of a connection set-up between the charging column and the vehicle, required current and/or voltage values at the start of the charging operation and/or over the further course of the charging operation. This means that the charging behavior is defined by said characteristic values typical of charging and the charging behavior of the vehicle itself can be sufficiently characterized by capturing said characteristic values.

The present invention also relates to a system for identifying a vehicle type a vehicle having an electric drive and a traction battery.

The system according to aspects of the invention at least comprises a sensor or capture unit which is configured to capture a charging behavior that occurs during a current operation of charging the traction battery at a charging column, a computer unit which is configured to create a current charging profile for the current charging operation on the basis of the captured charging behavior and to compare the current charging profile with respective charging profiles which are retrievably stored in a storage unit and are each specific to a respective particular vehicle type from a plurality of vehicle types and to determine a probability of a presence of a particular vehicle type from the plurality of vehicle types on the basis of the comparison and to identify the vehicle type which is most likely to be present as the vehicle type of the vehicle, and an optimization unit which is configured to adapt the current charging operation to the vehicle type which is most likely to be present, wherein the charging column, the sensor or capture unit, the computer unit, the storage unit and the optimization unit have a technical communicative connection to one another during operation of the system.

In this case, the wording "have a technical communicative connection" means that said components, that is to say the charging column, the sensor or capture unit, the computer unit, the storage unit and the optimization unit, can transmit and/or receive data and/or signals in a wired and/or wireless manner among one another. It is conceivable for the respective communication between the various components to all be based on the same technology, for example on a selected radio technology using specific communication protocols such as GSM, UMTS, IEEE 802.11 (WLAN) or Bluetooth.

It is also conceivable for a first group of said components to interchange data and/or signals with one another in a wired manner, while a second group of said components communicate in a wireless manner with one another.

In one configuration of the system according to aspects of the invention, the system also comprises the charging column itself, wherein the charging column comprises connection means (e.g., a cable having a plug that is configured to be connected to the vehicle) and technical communication means (e.g., transmitter, receiver, transceiver, electrical wire cable, etc.) and is configured to be connected to the traction battery by means of the connection means and to charge said traction battery and to transmit signals to the sensor unit, the computer unit, the storage unit and/or the optimization unit and/or to receive signals from the sensor unit, from the computer unit, from the storage unit and/or from the optimization unit by means of the communication means.

In another configuration, the system according to aspects of the invention also comprises said storage unit which is configured to retrievably store charging profiles which are each specific to a respective particular vehicle type or to a network of vehicle types.

In another configuration, the storage unit and/or the computer unit and/or the optimization unit is/are implemented in a computer cloud, that is to say a so-called cloud, wherein the charging column and/or the sensor or capture unit is/are connected to the computer cloud via a network connection and can transmit and/or receive signals thereby.

The computer cloud is substantially an IT infrastructure which provides storage space, computer power or else application software as a service, generally via the Internet. This IT infrastructure, that is to say the cloud, is accessible via technical interfaces and protocols and possibly via a web browser. Therefore, the charging column and/or the sensor or capture unit must be connected to the computer cloud via said network connection and a corresponding interface using a predefined protocol in order to be able to transmit and/or receive signals thereby.

In a further configuration of the method according to aspects of the invention, the sensor or capture unit is integrated in the charging column, that is to say the sensor or capture unit is part of the charging column.

The present invention also relates to a computer program product having a computer-readable medium and a computer program which is stored on the computer-readable medium and has program code means which are suitable, when the computer program runs on a computer, in particular on the computer unit mentioned above, for carrying out a method according to aspects of the invention described above.

BRIEF DESCRIPTION OF THE DRAWING

Further advantages and configurations of invention emerge from the description and the accompanying drawing.

DETAILED DESCRIPTION OF THE INVENTION

Figure 1:
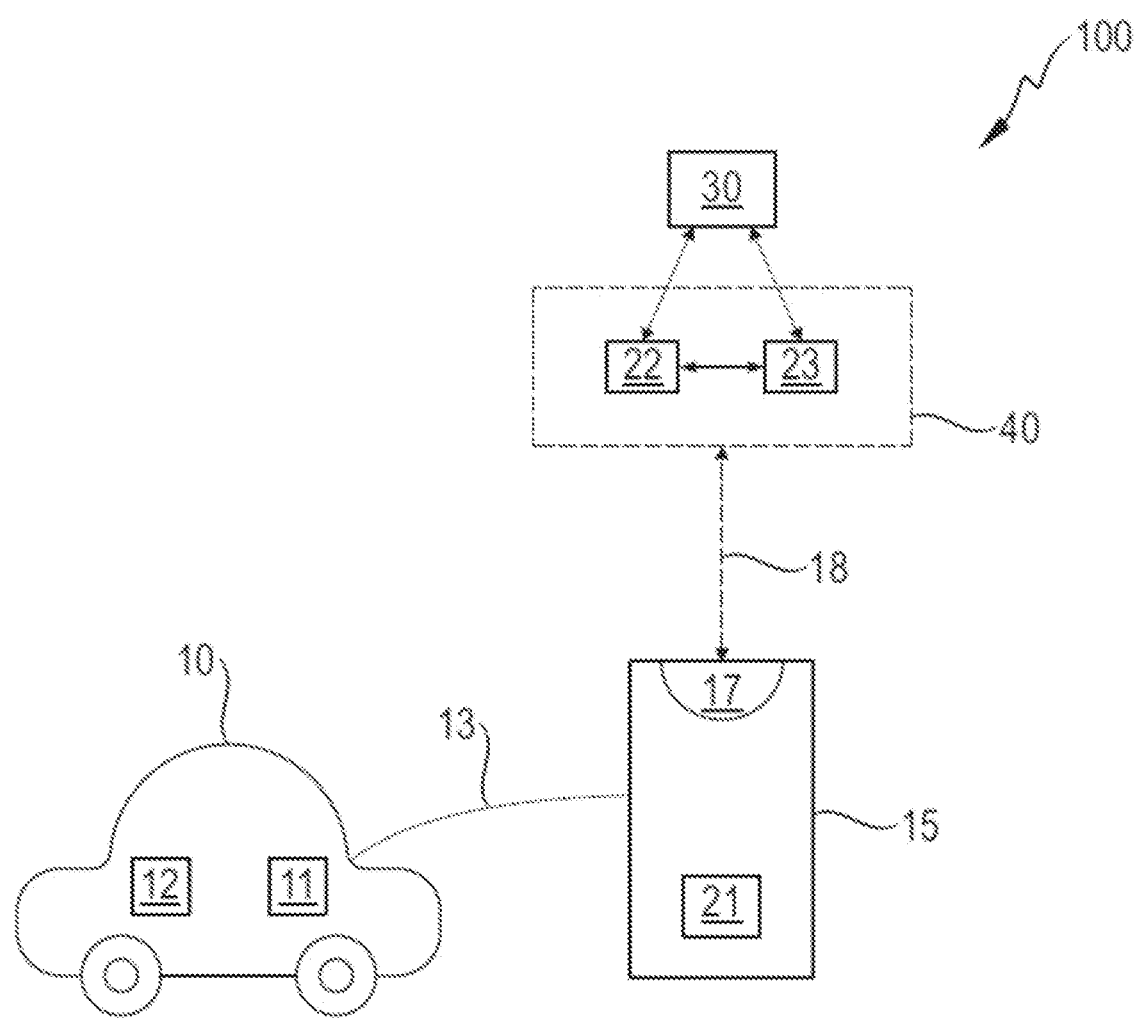
FIG. 1 shows a schematic illustration of one embodiment of the system according to aspects of the invention for carrying out one embodiment of the method according to aspects of the invention.

It goes without saying that the features mentioned above and the features yet to be explained below can be used not only in the respectively stated combination but also in other combinations or alone without departing from the scope of the present invention.

The invention is schematically illustrated in the drawing on the basis of one embodiment and is described in detail with reference to the drawing.

Figure 2:
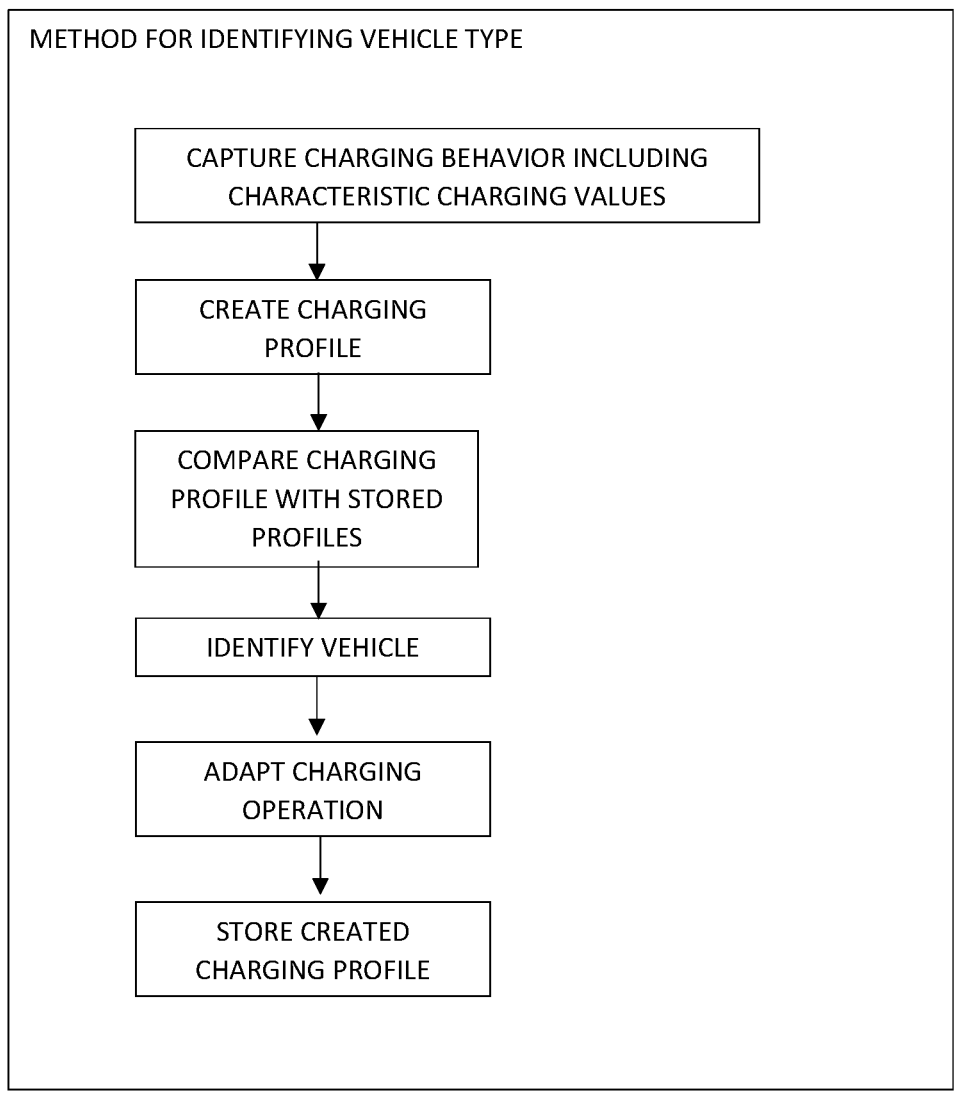
FIG. 2 shows a schematic flowchart of a method for identifying vehicle type.

FIG. 1 shows a system 100 for identifying a vehicle type of a vehicle 10, wherein the vehicle 10 comprises an electric drive 12 and a traction battery 11. FIG. 2 is a flowchart depicting a method for identifying the vehicle type of the vehicle 10. In order to charge the traction battery 11 so that the latter can in turn provide the electric drive 12 with electric energy, the traction battery 11 or the vehicle 10 is connected to a charging station or a charging column 15 via a connection 13, generally via a charging cable. This means that the charging column 15 has suitable connection means which can be used to connect the vehicle 10 to the charging column 15. The charging column 15 also comprises technical communication means 17, with the aid of which the charging column 15 can be technically communicatively connected to components of the system 100 via a connection 18. The system 100 according to aspects of the invention comprises a sensor or capture unit 21 which is configured to capture a charging behavior of the vehicle 10 that occurs during a current operation of charging the traction battery 11 at the charging column 15. The system also comprises a computer unit 22 which is configured to create a current charging profile for the charging operation on the basis of the captured charging behavior and to compare the current charging profile with respective charging profiles which are retrievably stored in a storage unit 30 and are specific to a respective particular vehicle type from a plurality of vehicle types and to determine a probability of a presence of a particular vehicle type from the plurality of vehicle types on the basis of the comparison and to identify the vehicle type which is most likely to be present as the vehicle type of the vehicle 10. The system also comprises an optimization unit 23 which is configured to adapt the current charging operation to the vehicle type which is most likely to be present. In this case, the charging column 15, the sensor or capture unit 21, the computer unit 22, the storage unit 30 and the optimization unit 23 have a technical communicative connection as components, as indicated by respective arrows, which means that they are each able to transmit signals and/or data to at least one further one of the components and/or to receive signals and/or data from at least one further one of the components. It is conceivable for the sensor or capture unit 21 to be integrated in the charging column 15, as illustrated here, that is to say to be virtually part of the charging column. It is also conceivable for the computer unit 22 and the optimization unit 23 to form a unit and to be implemented on a computer 40. It is also conceivable for the optimization unit 23 and/or the computer unit 22 to be implemented in a computer cloud and to be accessible to the charging column 15 and the sensor or capture unit 21 integrated in the latter via a network connection 18, generally via an Internet connection. The same applies to the storage unit 30 in one possible configuration.

In order to carry out one embodiment of the method according to aspects of the invention, the charging behavior of the vehicle 10 is captured by the sensor or capture unit 21 during an operation of charging the vehicle 10, wherein characteristic values typical of charging, for example parameters when setting up a connection between the charging column 15 and the vehicle 10, are generally captured in this case, wherein these parameters may be, for example, a timing, a sequence or signals transmitted between the charging column and the vehicle. Characteristic values typical of charging are also, for example, typical current and/or voltage values requested by the vehicle 10 at the start of the charging operation and/or over the further course of the charging operation.

The captured charging behavior of the vehicle 10 and the captured characteristic values typical of charging are transmitted from the sensor or capture unit 21 to the computer unit 22.

On the basis of the captured characteristic values typical of charging, the computer unit 22 is used to create a charging profile for the currently running operation of charging the vehicle 10. The created charging profile is compared with charging profiles which are specific to the vehicle type and are retrievably stored in the storage unit 30, wherein the stored charging profiles are generally previously recorded charging profiles specific to the vehicle type.

On the basis of the comparison which has been carried out, a respective probability of a respective one of the charging profiles stored in the database 30 matching the currently created charging profile is calculated. In order to determine a match, predefined features whose greatest possible matches should be considered with priority are generally used. All charging profiles are each associated with a vehicle type and are stored with this association in the storage unit 30. The vehicle type associated with the charging profile having the greatest matches with the currently created charging profile in terms of the predetermined features is identified as the vehicle type of the vehicle 10. After the vehicle type of the vehicle 10 has been identified, the charging operation is adapted with regard to predefined criteria, for example charging time, costs and charging reliability.

What is claimed is:

1. A method for identifying a vehicle type of a vehicle having an electric drive and a traction battery, comprising the steps of:
    capturing a charging behavior of the vehicle that occurs during a current operation of charging the traction battery at a charging column,
    creating a current charging profile for the current charging operation on a basis of the captured charging behavior,
    comparing the current charging profile with respective charging profiles which are retrievably stored in a storage unit and are each specific to a respective particular vehicle type from a plurality of vehicle types,
    identifying an original equipment manufacturer and a series of the vehicle based upon the comparison,
    adapting the current charging operation to the identified vehicle type, wherein said adapting step occurs after said identifying step, and said adapting step comprises setting a remaining charging time for the vehicle, and
    retrievably storing in the storage unit charging profiles of vehicles which have previously been charged and from which a respective charging profile has accordingly been created.

2. The method as claimed in claim 1, in which the created current charging profile is retrievably stored in the storage unit and is therefore provided for a future comparison with a charging profile to be accordingly created in future.

3. The method as claimed in claim 1, in which the charging operation is adapted specifically to the identified vehicle type with respect to charging costs or charging reliability.

4. The method as claimed in claim 1, in which the capture of the charging behavior comprises capturing characteristic values typical of charging, wherein the characteristic values comprise (i) parameters of a connection set-up between the charging column and the vehicle, (ii) required current or voltage values at the start of the charging operation or over a further course of the charging operation, or both (i) and (ii).

5. The method as claimed in claim 1, in which the capture of the charging behavior comprises capturing a timing, sequence or signals transmitted between the charging column and the vehicle.

6. The method as claimed in claim 1, wherein the adapting step comprises adapting the current charging operation to a vehicle manufacturer specific implementation of a charging operation.

7. A system for identifying a vehicle type of a vehicle having an electric drive and a traction battery, the system comprising:
- a sensor unit which is configured to capture a charging behavior of the vehicle that occurs during a current operation of charging the traction battery at a charging column,
- a computer unit which is configured to (i) create a current charging profile for the current charging operation on a basis of the captured charging behavior, (ii) compare the current charging profile with respective charging profiles which are retrievably stored in a storage unit and are each specific to a respective particular vehicle from a plurality of vehicles, (iii) identify an original equipment manufacturer and series of the vehicle based upon the comparison, and
- an optimization unit which is configured to adapt the current charging operation to the vehicle type after the computer unit identifies the original equipment manufacturer and series of the vehicle based upon the comparison, wherein adapting the current charging operation to the vehicle type comprises setting a remaining charging time for the vehicle,
- wherein the charging column, the sensor unit, the computer unit, the storage unit and the optimization unit have a technical communicative connection to one another during operation of the system.

8. The system as claimed in claim 7 further comprising the charging column, wherein the charging column comprises connection means and technical communication means and is configured to be connected to the traction battery by the connection means,
the charging column being configured to (i) charge said traction battery, (ii) transmit signals by way of the communication means to one or more of the sensor unit, the computer unit, the storage unit and the optimization unit, and (iii) receive signals by way of the communication means from one or more of the sensor unit, the computer unit, the storage unit and the optimization unit.

9. The system as claimed in claim 7 further comprising the storage unit which is configured to retrievably store charging profiles which are each specific to a respective particular vehicle type from the plurality of vehicle types in a database.

10. The system as claimed in claim 7, in which one or more of the storage unit, the computer unit, and the optimization unit is/are implemented in a computer cloud, wherein the charging column is either connected or is connectable to the computer cloud via a network connection and can transmit or receive signals via the network connection.

11. The system as claimed in claim 7, in which the sensor unit is integrated in the charging column.

12. A computer program product having a computer-readable medium and a computer program which is stored on the computer-readable medium and has program code means, wherein the computer program runs on the computer unit provided in the system as claimed in claim 7.

13. The system as claimed in claim 7, in which the capture of the charging behavior comprises capturing a timing, sequence or signals transmitted between the charging column and the vehicle.

14. The system as claimed in claim 7, wherein the optimization unit is configured to adapt the current charging operation to a vehicle manufacturer specific implementation of a charging operation.

* * * * *